United States Patent
Fiorentino et al.

(10) Patent No.: US 12,108,262 B2
(45) Date of Patent: Oct. 1, 2024

(54) METHODS OF COMMUNICATING BETWEEN A RADIO UNIT AND A DISTRIBUTED UNIT

(71) Applicant: Siemens Aktiengesellschaft, Munich (DE)

(72) Inventors: Vincenzo Fiorentino, Nuremberg (DE); Sander Rotmensen, Altdorf bei Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/578,889

(22) PCT Filed: Jun. 3, 2022

(86) PCT No.: PCT/EP2022/065146
§ 371 (c)(1),
(2) Date: Jan. 12, 2024

(87) PCT Pub. No.: WO2023/001441
PCT Pub. Date: Jan. 26, 2023

(65) Prior Publication Data
US 2024/0267758 A1    Aug. 8, 2024

(30) Foreign Application Priority Data
Jul. 23, 2021 (EP) .................................. 21187484

(51) Int. Cl.
*H04W 24/02* (2009.01)
*H04W 88/08* (2009.01)

(52) U.S. Cl.
CPC .......... *H04W 24/02* (2013.01); *H04W 88/085* (2013.01)

(58) Field of Classification Search
None
See application file for complete search history.

(56) References Cited

U.S. PATENT DOCUMENTS

2019/0053317 A1   2/2019   Hampel et al.
2019/0372837 A1   12/2019   Yang
(Continued)

FOREIGN PATENT DOCUMENTS

EP    3627716 A1 *   3/2020   ............. H04B 7/022
GB    2557960 A   7/2018
(Continued)

OTHER PUBLICATIONS

S. Bhattacharjee et al., "Network slicing for TSN-based transport networks", IEEE Access, Apr. 21, 2021 (Year: 2021).*
(Continued)

*Primary Examiner* — Faruk Hamza
*Assistant Examiner* — Cassandra L Decker
(74) *Attorney, Agent, or Firm* — Lempia Summerfield Katz LLC

(57) ABSTRACT

A method of communicating between a first radio unit and a first distributed unit of an operational wireless network in an industrial facility is disclosed. The method includes: providing a dedicated wireless subnetwork associated with the first radio unit; receiving at least one data packet from a user device, wherein the at least one data packet is associated with a first user plane or a first control plane with the operational wireless network; and transmitting the at least one data packet to the first distributed unit via a second user plane of the dedicated wireless subnetwork. The dedicated wireless subnetwork includes a dedicated user device connected to the first radio unit and a dedicated base station including a dedicated radio unit connected to the dedicated user device. The configuration of the second user plane is distinct from the configuration of the first user plane.

11 Claims, 3 Drawing Sheets

(56) References Cited

U.S. PATENT DOCUMENTS

| | | | |
|---|---|---|---|
| 2021/0112565 A1* | 4/2021 | Bhaskaran | H04W 8/18 |
| 2022/0225153 A1* | 7/2022 | Panchal | H04W 28/0268 |
| 2022/0256582 A1* | 8/2022 | Islam | H04B 7/15528 |

FOREIGN PATENT DOCUMENTS

| | | |
|---|---|---|
| WO | 2017070635 A1 | 4/2017 |
| WO | 2019245442 A1 | 12/2019 |

OTHER PUBLICATIONS

PCT International Search Report and Written Opinion of International Searching Authority mailed Sep. 1, 2022 corresponding to PCT International Application No. PCT/EP2022/065146, pp. 1-15.

* cited by examiner

METHODS OF COMMUNICATING BETWEEN A RADIO UNIT AND A DISTRIBUTED UNIT

The present patent document is a § 371 nationalization of PCT Application Serial No. PCT/EP2022/065146, filed Jun. 3, 2022, designating the United States, and this patent document also claims the benefit of European Patent Application No. 21187484.7, filed Jul. 23, 2021, which are incorporated by reference in their entireties.

TECHNICAL FIELD

The current disclosure relates to industrial wireless networks and more particularly to connections between radio unit and distributed unit of a distributed base station in an industrial facility.

BACKGROUND

Due to the nature of industrial applications, associated communication infrastructure must be able to provide low latency and high data rate connection.

In industry facilities, wireless communication networks may be needed to connect remote locations, which may not be reachable by cables or fibers. Such connection is currently realized with various radio technologies.

Current wireless networks, for example, are based on fourth generation mobile technology and may be replaced by 5G technologies. 5G network deployment would utilize distributed base stations and accordingly, would utilize a plurality of radio units along with distributed unit and central unit. The radio units (also referred to RUs) of the 5G network would be located remote locations in the industrial facility and would have to be connected to the 5G Distributed units (DU). The network connecting them is required to support the latency and the data rate of the 5G fronthaul, (i.e., network side between the decentralized unit and radio units), which may exceed the 10 Gbps and requires and End-to-End latency less than 1 ms. Conventionally, this has been achieved using wired connections between radio units and distributed units. However, in remote locations that are not reachable by cable or fibers, wired connections cannot be used to connect radio units at these locations to the corresponding distributed unit. Accordingly, there is a need for a method and a device with addresses the issue mentioned above.

SUMMARY AND DESCRIPTION

Accordingly, the current disclosure describes a method, a dedicated base station, and a dedicated subnetwork that addresses the issues mentioned above. The scope of the present disclosure is defined solely by the appended claims and is not affected to any degree by the statements within this summary. The present embodiments may obviate one or more of the drawbacks or limitations in the related art.

The current disclosure describes a method of communicating between a first radio unit and a first distributed unit of an operational wireless network in an industrial facility. The method includes: providing a dedicated wireless subnetwork associated with the first radio unit; receiving at least one data packet from a user device, wherein the at least one data packet is associated with a first user plane or a first control plane with the operational wireless network; and transmitting the at least one data packet to the first distributed unit via a second user plane of the dedicated wireless subnetwork. The dedicated wireless subnetwork includes: a dedicated user device connected to the first radio unit; and a dedicated base station including a dedicated radio unit connected to the dedicated user device. Additionally, the dedicated wireless subnetwork includes the second user plane and a second control plane, wherein the configuration of the second user plane is distinct from the configuration of the first user plane and the configuration of the second control plane is distinct from the first control plane.

Accordingly, the current disclosure describes the above-mentioned method in which radio units located at remote locations may be connected to distributed units via a dedicated wireless subnetwork. The subnetwork is based on wireless cellular architecture already present in the industrial facility accordingly, the resources of the existing wireless network may be utilized to create and operate the wireless subnetwork. Additionally, because the dedicated subnetwork is dedicated to transmit packets from the radio units to the distributed unit, the subnetwork may be configured for low latency communication.

In an example, the dedicated user device is affixed to a predefined location within a proximity of the first radio unit. Accordingly, the dedicated user device may be connected wired or wireless means to the first radio unit.

In an example, the operational wireless network includes: a first network slice associated with the first user plane and the first control plane; and a second network slice associated with the second user plane and the second control plane. Accordingly, by using two separate network slices, configuration of the operational network and the dedicated subnetwork may be performed separately. Additionally, custom network functions may be utilized for the dedicated subnetwork to optimize the behavior of the entities of the dedicated subnetwork without impacting the operational network.

In an example, the dedicated user device includes a first interface configured to map one or more protocols associated the first user plane and the first control plane to one or more protocols of the second user plane. Accordingly, the dedicated user device is configured to receive the one or more data packets from the first radio device and encapsulate or tunnel the data packets over the second user plane of the dedicated subnetwork by performing the appropriate packet encapsulation and protocol conversion using the first interface. In an example, the method further includes receiving at least one another data packet from the first distributed unit via the dedicated wireless subnetwork, the at least one another data packet is associated with the first user plane or the first control plane.

In an example, the first network slice is configured to operate as a time sensitive network (TSN) bridge in a TSN. The first network slice is configured to receive one or more requirements associated with a time sensitive network (TSN) and translate the one or more requirements for the second network slice associated with the dedicated subnetwork. Accordingly, the dedicated subnetwork may be configured in accordance with the TSN requirements to provide appropriate latency and Quality of Service (QOS) between the radio units and the distributed unit.

In another aspect, the current disclosure describes a dedicated base station for connecting a first radio unit and a first distributed unit of an operational wireless network in an industrial facility. The dedicated base station includes: a dedicated radio unit capable of wirelessly connecting to a dedicated user device associated with the first radio unit; and a dedicated distributed unit communicatively connected to the dedicated radio unit and the first distributed unit. The dedicated base station is configured to receive one or more data packets from the first radio unit or transmit one or more data packets to the first radio unit via the dedicated user device over a second user plane, wherein the one or more data packets are associated with the first user plane or the first control plane.

In yet another aspect, the current disclosure describes a dedicated wireless sub network for connecting a first radio unit and a first distributed unit of an operational wireless network in an industrial facility. The dedicated wireless sub network includes: a dedicated user device affixed at a predefined location with a proximity of the first radio unit, communicatively coupled to the first radio unit; a dedicated base station including a dedicated radio unit capable of wirelessly connecting to a dedicated user device associated with the first radio unit and a dedicated distributed unit communicatively connected to the dedicated radio unit and the first distributed unit; and a dedicated user plane for transmission of data packets between the dedicated user device and the dedicated base station, wherein the dedicated user plane is configured to tunnel data packets associated with a first control plane or a first data plane associated with the first radio unit and the first distributed unit. The advantages of the method are applicable to the dedicated base station and dedicated wireless sub network. This is further explained in reference to the figures.

DETAILED DESCRIPTION

Figure 1:
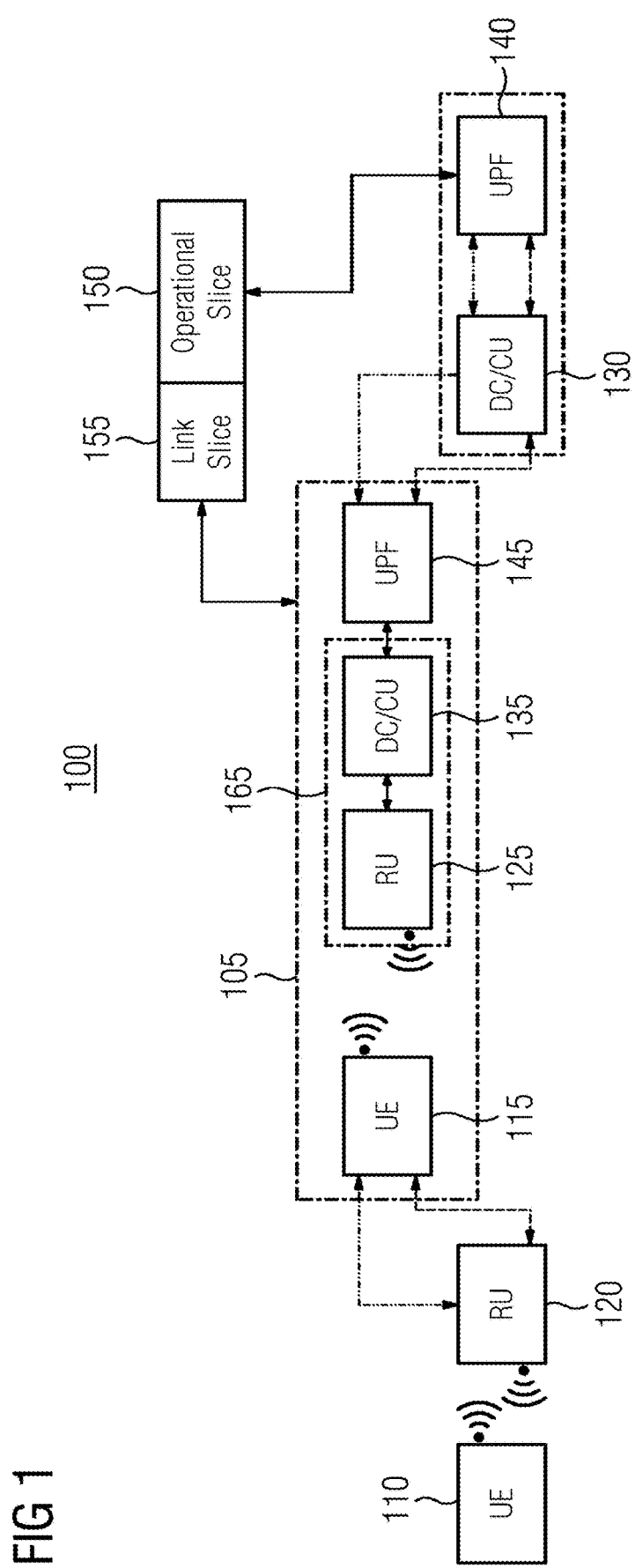
FIG. 1 depicts an example of a wireless network 100 in an industrial facility.

FIG. 1 illustrates a wireless network 100 in an industrial facility. The term "industrial facility" herein refers to any environment where one or more industrial processes such as manufacturing, refining, smelting, or assembly of equipment may take place. This includes process plants, oil refineries, automobile factories, power plants, storehouses, etc. The industrial facility includes a plurality of industrial devices including control devices, field devices, mobile devices, operator stations, etc. The control devices include process controllers, programmable logic controllers, supervisory controllers, automated guided vehicles, robots, operator devices, etc. One or more control devices are connected to a plurality of field devices (not shown in figure) such as actuators and sensor devices for monitoring and controlling various industrial processes in the industrial facility. These field devices may include flowmeters, value actuators, temperature sensors, pressure sensors, etc. Additionally, the industrial facility includes a plurality of mobile devices including: one or more robots for performing a plurality of operations such as welding or assembly of parts; one or more autonomous guided vehicles for transportation and handling of material; one or more assets with RFID tags on conveyor belts, etc. in the industrial facility. Additionally, the industrial facility may include an operator station for displaying the status of the industrial facility to an operator and for allowing the operator to define KPIs for the control of the industrial processes in the facility. All the industrial devices may be connected to each other via a plant network (realized via wired and wireless technologies).

Communication in the above-mentioned plant network happens through wired and wireless means or technologies. Accordingly, the industrial facility includes a wireless network 100 for enabling communication amongst the various devices of the industrial facility. The wireless network 100 is based on cellular technology and includes a plurality of gateway devices. "Gateway devices" herein refer to one or more network devices capable of connecting the user devices to the wireless network. Examples of gateway devices include base stations, routers, switches, relays, access points, etc. The plurality of gateway devices may include stationary gateway devices that may be affixed to a plurality of locations in the industrial facility. A plurality of the user devices in the facility are connected to one or more industrial gateway devices to connect to the wireless network 100 and for communicating information with the other devices and systems in the industrial facility. "User device" herein refers to an industrial device capable of connecting to a wireless network via the gateway devices. The user devices include one or more industrial applications which are capable of processing data from other industrial devices.

One such example gateway device includes a distributed base station as shown in FIG. 1. The distributed base station includes a radio unit 120 (also referred to as RU 120) and distributed and central units (130). While the distributed unit and the central unit are shown in the figure as a single device, the distributed unit and the central unit may be implemented over two separate devices as well. The distributed base station is connected to a user plane function 140 of the wireless network for transmitting data packets from the one or more user devices (shown in the figure as user device 110) connected to the radio unit 120. The radio unit 120 is connected to the distributed and central units 130 via a dedicated wireless subnetwork 105. The dedicated wireless subnetwork 105 is based on cellular technology and includes a dedicated base station 165, a user equipment 115 (also referred to as dedicated user device 115), and a user plane function 145. The dedicated wireless subnetwork may work either at the microwave frequencies (e.g., the 5G FR2 in the mm-Wave band) as well as in the same sub-6 GHZ 5G band or in any other frequency band for the utilities.

The user equipment 115 is connected to the radio unit 120 via wired or wireless means and is configured to receive data packets from the radio unit 120. The user equipment 115 is then configured to transmit these packets wirelessly to the radio unit 125 of the dedicated base station 165 for transmission to the distributed and central unit 130 via the dedicated base station 165 and the user plane function 145. The dedicated user device 115 is affixed to a predefined location within a proximity of the first radio unit 120. Accordingly, the dedicated wireless subnetwork acts as a tunnel or bridge between the radio unit 120 and the distributed and central units of the distributed base station of the operational network 100. Additionally, the wireless network 100 includes a first network slice 150 (also referred to as operational slice 150) and a second network slice 155 (also referred to as link slice 155). The operational slice 150 is for configuring and controlling the network devices of the wireless network including the first user and control planes of the operational wireless network and the link slice 155 is for configuring and controlling the network devices of the dedicated wireless subnetwork 105 including the second user and control planes of the wireless subnetwork 105. Accordingly, the link slice 155 may have different network properties as compared to operational slice to enable appropriate functioning of the dedicated wireless subnetwork 105 as a tunnel or channel between radio unit 120 and the distributed and central units 130. This and other aspects of the dedicated wireless subnetwork 105 are explained below in the description of FIG. 2.

Figure 2:
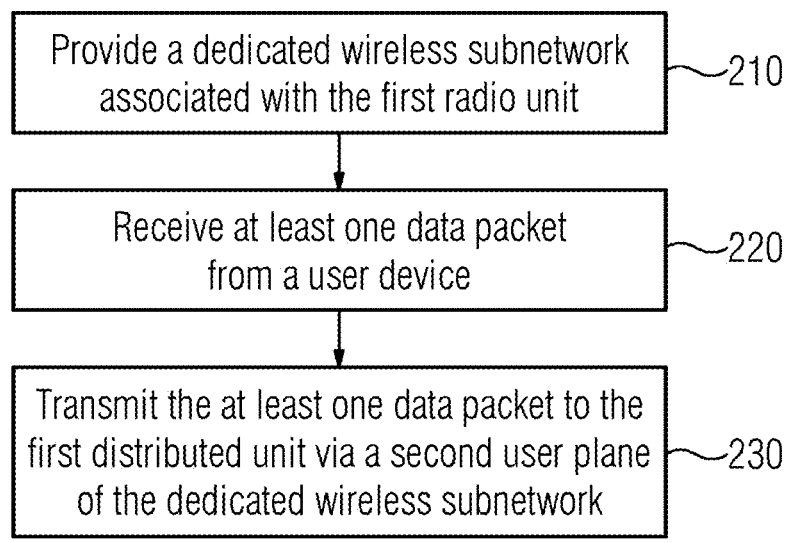
FIG. 2 depicts an example of a method of communicating between the radio unit and a distributed unit of the wireless network in an industrial facility.

FIG. 2 illustrates a method 200 of communicating between the radio unit 120 (also referred to as first radio unit 120) and a distributed unit 130 (also referred to as first distributed unit 130) of the wireless network 100 (also referred to as operational wireless network 100) in an industrial facility. In an example, the method 200 is performed by the radio unit 120 of the distributed base station of the operation wireless network 100.

At act 210, a dedicated wireless subnetwork 105 associated with the first radio unit 120 is provided. While the dedicated wireless subnetwork 105 is associated with the first radio unit 120, the dedicated wireless subnetwork 105 may also be associated with more radio units of the operational wireless network 100. As mentioned previously, the dedicated wireless subnetwork 105 includes a dedicated user device 115 connected to the first radio unit 120. The user device 115 is connected to the first radio unit via wired or wireless means. In an example, the user device 115 is connected via an ethernet based connection or via a short range wireless connection. The user device 115 is capable of connecting to a dedicated radio unit 125 of a base station 165. The behavior of the user device 115 is different from the behavior of the user devices (for example user device 110) of the operational wireless network 100, because the user device 115 is affixed to a predefined location and is permanently connected to the radio unit 125 as opposed to switching from one radio unit to another radio unit. Similarly, the behavior of the radio unit 125 is different from the radio units of the operational wireless network 100 (for example the first radio unit 120).

At act 220, the first radio unit 120 receives at least one data packet from a user device 110. The at least one data packet is associated with a first user plane or a first control plane with the operational wireless network 100. "User plane" herein refers one or more protocols or protocol stacks on the devices of the network, related to transmission of data. "Control plane" herein refers to protocols or protocol stacks on the devices of the network, related to establishment of network connection, management of network interfaces, management of mobility, etc. Accordingly, the at least one packet includes data to be transmitted or is related to a configuration associated with the network device of the operational network 100.

In an example, the at least one data packet is generated by an industrial application running on the user device 110 and is accordingly transmitted to the first radio unit 120 over the first user plane associated with the operational wireless network 100. Then, at act 230, the first radio unit 120 transmits the at least one data packet to the first distributed unit (130) via a user plane of the dedicated wireless subnetwork 105. This transmission is performed via the user device 115, the dedicated base station 165 of the dedicated wireless subnetwork 105, and the user plane function 145. Accordingly, subsequent to the receipt of the at least one data packet, the first radio unit 120 transmits the at least one data packet to the user device 115. The user device 115 then transmits the at least one data packet to the radio unit 125 of the dedicated base station 165 which then transmits the at least one data packet to the user plane function 145. This transmission happens over a second user plane of the dedicated wireless subnetwork 105. Upon receipt of the at least one data packet at the radio unit 125, the radio unit 125 transmits the at least one data packet to the distributed and central unit 135 of the dedicated base station 165, which in turns transmits the data packet to a user plane function 145 of the dedicated wireless subnetwork 105. Finally, via the user plane function 145, the at least one data packet is transmitted to the first distributed unit 130. Accordingly, the at least one data packet is transmitted from the radio unit 120 to the first distributed unit 130.

As previously mentioned, in order to provide that the above mentioned transmission occurs with low latency and high reliability, elements of the dedicated wireless subnetwork 105 are configured to appropriately to act as a bridge between the first radio unit 120 and the first distributed unit 130. Accordingly, the configuration of the second user plane of the dedicated wireless subnetwork 105 is distinct from the configuration of the first user plane of the operational wireless network 100 and the configuration of the second control plane of the dedicated wireless subnetwork 105 is distinct from the first control plane of the operational wireless network 100. This is further illustrated below with examples.

In a first example, the dedicated wireless subnetwork 105 has a static configuration to offer the best performance, e.g., ultra-low latency for the data packets to be transmitted between the first radio unit 120 and the first distributed unit 130. Accordingly, for this low latency, the user device 115 is configured such that the user device 115 authenticates itself to the radio unit 125 only once and then the user device 115 remains in an always on state (i.e., in a 'always connected state'). This allows a fast call set up between the user device 115 and the radio unit 125 to achieve very low latency. This is enabled by the configuration of the second data and second control planes of the dedicated wireless subnetwork. Additionally, the dedicated wireless subnetwork 105 has a fixed configuration to provide the lowest latency possible. Accordingly, the devices of the dedicated wireless subnetwork 105 uses the sub-carrier spacing (e.g., highest numerology for 5G possible) and makes use of self-contained and minimum slots according to the 3GPP specifications. In another example, the behavior of dedicated wireless subnetwork 105 is dynamic and allocates the resources upon each request from user device 115 with the corresponding QoS. This approach in an example is implemented when the transport of different service levels is required. This is performed using a specific function which translates the service level request QoS. The link slice 155 allocates necessary resources based on the request.

In an example, the dedicated user device 115 includes a first interface configured to map one or more protocols associated the first user plane and the first control plane to one or more protocols of the second user plane. Conventionally, different fronthaul protocols may be used between RU 120 and DU 130, depending on the logical split option used for the protocol stacks, e.g., eCPRI or nFAPI. Accordingly, the UE or user device 115 includes an interface capable to encapsulate the fronthaul protocol (e.g., eCPRI) used between the RU 120 and the DU 130 of the operational network 100 into the IP protocol (or standard 5G protocol) used for the communication inside the wireless subnetwork 105. Similarly, the UPF 145 of the sub-network 105 includes an interface (also referred to as interface function) which extracts the fronthaul protocol from the IP transport layer used into the subnetwork 105 and delivers the corresponding packets (e.g., eCPRI) to the DU 130. In a reciprocal way, the encapsulation of the fronthaul protocol takes place when the packets are sent in down link from the DU 130 to the RU 120. The fronthaul protocol is encapsulated the UPF 145 of the subnetwork 105 into the IP layer of the packets transmitted over the wireless subnetwork 105, which is then decapsulated by the first interface of the user device 115 to deliver the eCPRI packet to the RU 120.

It is to be noted by a person skilled in the art that while the above method is explained in relation to a transmission from the radio unit 120 to the distributed unit 130, it may be understood that the abovementioned method and dedicated subnetwork may be used for transmission of packets from the distributed unit to the radio unit as well. The dedicated subnetwork may be used for bidirectional communication.

Accordingly, the current disclosure addresses the problem of transmission between remote radio units and distributed units of the operational wireless network by introducing the dedicated wireless subnetwork which is based on the same technology and architecture as the operational wireless network and accordingly may use the same core network as the operational wireless network. Accordingly, the dedicated wireless subnetwork may be regarded as a nested sub network acting as a bridge between one or more network devices of the operational wireless network. In an example, the operational wireless network is utilized to act as a virtual TSN bridge in a TSN. This is further illustrated in relation to FIG. 3.

Figure 3:
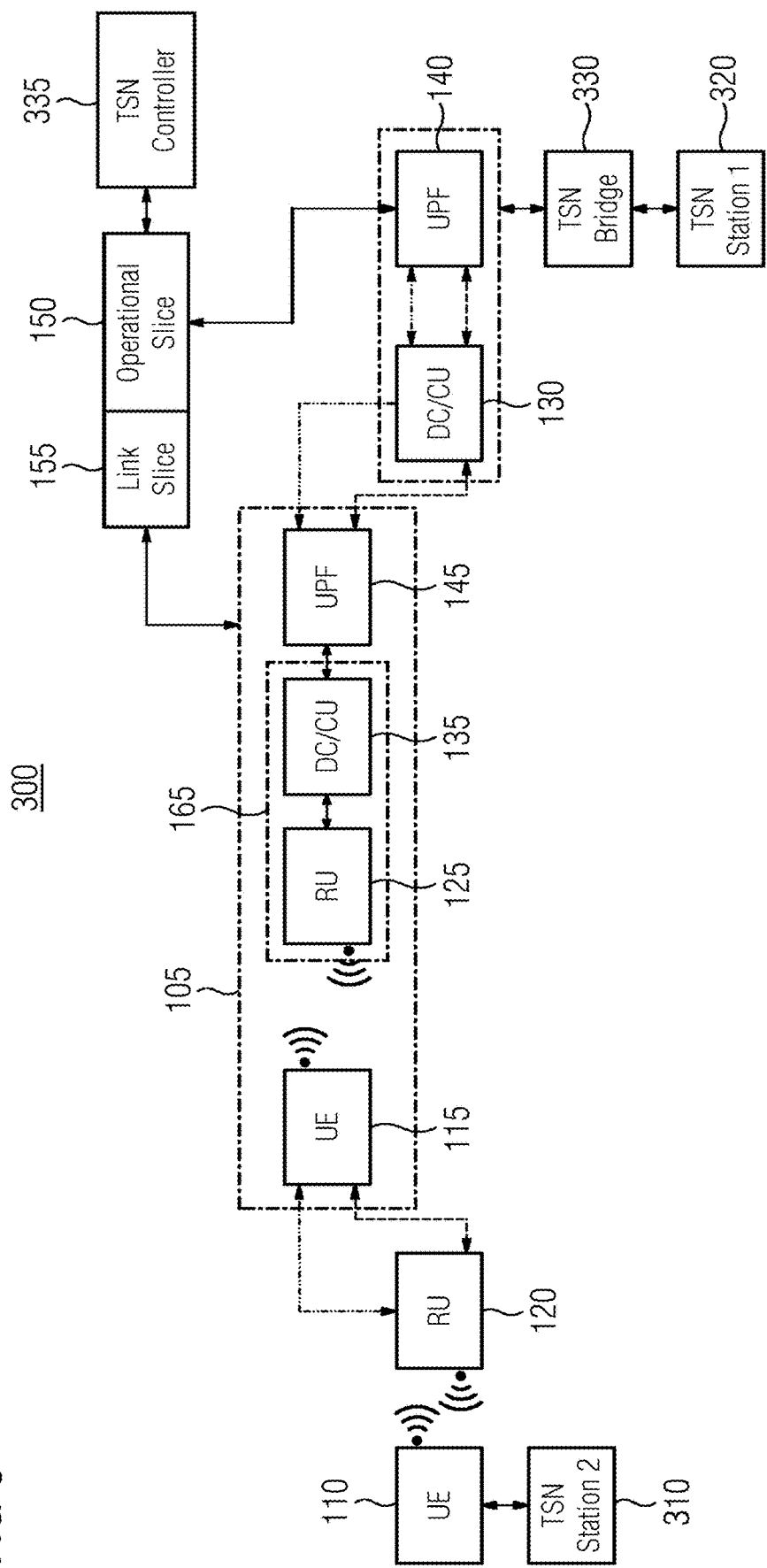
FIG. 3 depicts an example of a wireless network acting as a virtual TSN bridge between two TSN stations.

FIG. 3 illustrates a wireless network acting as a virtual TSN bridge between two TSN stations 310 and 320. The wireless network is based on the wireless network 100 as previously described. In addition to the previously mentioned elements or devices, the TSN includes a TSN controller 335 responsible for timing synchronization and traffic scheduling in relation to the TSN stations 310 and 320. Similarly, the TSN includes a TSN bridge 330 for connecting the TSN station 310 to the wireless network. The communication between the TSN stations 310 and 320 happens via the wireless network, particularly, via the user device 110 and the distributed unit 130 and the UPF 140. Accordingly, the TSN communication occurs via the dedicated wireless subnetwork 105. Accordingly, in order to provide that the TSN communication happens in line with the TSN requirements, the TSN controller 335, the operational slice 150 and the link slice 155 coordinate amongst themselves during the configuration of the link slice 155. All TSN related control information to set up a communication flow between a TSN station 310 and a TSN station 320 are sent from the TSN controller 335 to the operational slice 150. A new interworking function referred to as TSN_IWF (not shown in the figure) is introduced between the two core network slices 150 and 155. The TSN_IWF translates the TSN flow requirements from the operational slice 150 to the link slice 155 in order to guarantee that the communication streams (or tunnels) are set up in the dedicated wireless subnetwork 105 satisfy required quality of service associated with the TSN stations 310 and 320. In this way, the dedicated subnetwork is configured to support the requirements of the TSN. Additionally, the mapping of the user devices of the dedicated sub network 105 and the radio units of the operational wireless subnetwork is maintained by the operational slice 150 and this mapping information used by the TSN_IWF with Latency requirements, Priority classes, and QoS from the TSN controller 335.

Accordingly, the current disclosure describes a dedicated wireless subnetwork for connecting wireless remote radio units to corresponding distributed units of the operational wireless network using the same network technology and network core as the operational wireless network. Accordingly, the high performance requirements of the operational wireless network are fulfilled using the dedicated wireless subnetwork which is based on the same underlying technology as the operational wireless subnetwork. Accordingly, this allows for a cost effective manner of providing a connection between radio units and distributed units because the industrial facility owner is able to utilize the existing network core of the operational wireless network.

In another aspect, the current disclosure describes a dedicated base station 105 for connecting a first radio unit 120 and a first distributed unit 130 of an operational wireless network 100 in an industrial facility. The dedicated base station 105 includes: a dedicated radio unit 125 capable of wirelessly connecting to a dedicated user device 115 associated with the first radio unit 120; and a dedicated distributed unit 135 communicatively connected to the dedicated radio unit 125 and the first distributed unit 130. The dedicated base station 105 configured to receive one or more data packets from the first radio unit 120 or transmit one or more data packets to the first radio unit 120 via the dedicated user device 115 over a second user plane, wherein the one or more data packets are associated with the first user plane or the first control plane.

It may be noted by a person skilled in that art that the network devices and functions mentioned above (e.g., user devices 110 and 115, radio units 120 and 125, distributed units 130 and 165, user plane functions 140 and 145, and network slices 150 and 155) may be realized as independent hardware devices or as software in devices. Accordingly, the functions of the network devices may be realized using computer program product including program modules accessible from computer-usable or computer-readable medium storing program code for use by or in connection with one or more computers, processing units, or instruction execution system. For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

While the current disclosure is described with references to few industrial devices, a plurality of industrial devices may be utilized in the context of the current disclosure. Moreover, while the current disclosure is explained using a single subnetwork, a plurality of subnetworks may be used in the operational network. Similarly, while the current disclosure describes a single radio unit connected to the distributed unit via the wireless subnetwork 105, the wireless subnetwork may be used to connect a plurality of radio units to a plurality of distributed units. In such a scenario, the user plane of the wireless subnetwork may be configured appropriately to provide that the packets are transmitted in accordance with the QoS associated with the radio unit associated with the packets. Additionally, while the current disclosure is explained using data packets, other such data blocks such as datagrams, data frames may also be utilized in realization of the current disclosure.

While the present disclosure has been described in detail with reference to certain embodiments, the present disclosure is not limited to those embodiments. In view of the present disclosure, many modifications and variations would be present themselves, to those skilled in the art without departing from the scope of the various embodiments of the present disclosure, as described herein. All advantageous embodiments claimed in method claims may also be apply to system/apparatus claims.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of communicating between a first radio unit and a first distributed unit of an operational wireless network in an industrial facility, the method comprising:
    providing a dedicated wireless subnetwork associated with the first radio unit, the dedicated wireless subnetwork comprising a dedicated user device connected to the first radio unit, a dedicated radio unit of a base station connected to the dedicated user device, and a dedicated distributed unit connected to the dedicated radio unit and the first distributed unit;
    receiving, by the first radio unit, at least one data packet from a user device, wherein the at least one data packet is associated with ene of a first user plane or a first control plane of the operational wireless network; and
    transmitting, by the first radio unit, the at least one data packet to the first distributed unit via a second user plane of the dedicated wireless subnetwork,
    wherein the dedicated wireless subnetwork comprises the second user plane and a second control plane,
    wherein a configuration of the second user plane is distinct from a configuration of the first user plane,
    wherein a configuration of the second control plane is distinct from a configuration of the first control plane, and
    wherein the dedicated wireless subnetwork further comprises a user plane function, the user plane function for connecting the first distributed unit with the dedicated distributed unit.

2. The method of claim 1, wherein the dedicated user device is affixed to a predefined location within a proximity of the first radio unit.

3. The method of claim 1, wherein the operational wireless network comprises: a first network slice associated with the first user plane and the first control plane; and a second network slice associated with the second user plane and the second control plane.

4. The method of claim 3, wherein the first network slice is configured to operate as a time sensitive network (TSN) bridge in a TSN, and
    wherein the first network slice is configured to receive one or more requirements associated with the TSN and translate the one or more requirements for the second network slice.

5. The method of claim 1, wherein the dedicated user device comprises a first interface configured to map one or more protocols associated with the first user plane and the first control plane to one or more protocols of the second user plane.

6. The method of claim 1, further comprising:
    receiving, by the first radio unit, at least one additional data packet from the first distributed unit via the dedicated wireless subnetwork,
    wherein the at least one additional data packet is associated with the first user plane or the first control plane.

7. A dedicated base station for connecting a first radio unit and a first distributed unit of an operational wireless network in an industrial facility, the dedicated base station comprising:
    a dedicated radio unit capable of wirelessly connecting to a dedicated user device connected to the first radio unit; and
    a dedicated distributed unit capable of communicatively connecting to the dedicated radio unit and connecting to the first distributed unit via a user plane function,
    wherein the dedicated base station is configured to receive one or more data packets from the first radio unit and transmit one or more data packets to the first radio unit via the dedicated user device over a second user plane, and
    wherein the one or more data packets are associated with a first user plane or a first control plane associated with the first radio unit.

8. A dedicated wireless subnetwork for connecting a first radio unit and a first distributed unit of an operational wireless network in an industrial facility using a dedicated base station, the dedicated wireless subnetwork comprising:
    the dedicated base station comprising a dedicated radio unit and a dedicated distributed unit;
    a dedicated user device capable of being communicatively coupled to the first radio unit and communicatively coupled to the dedicated radio unit of the dedicated base station;
    a user plane function capable of being connected to the dedicated distributed unit of the dedicated base station and the first distributed unit; and
    a dedicated user plane for transmission of data packets between the dedicated user device and the dedicated base station,
    wherein the data packets are associated with a first user plane or a first control plane associated with the first radio unit, and
    wherein the dedicated user plane is configured to tunnel data packets associated with one of the first control plane or a first data plane associated with the first radio unit and the first distributed unit.

9. The dedicated wireless subnetwork of claim 8, wherein the dedicated user device comprises a first interface configured to map one or more protocols associated with the first user plane and the first control plane to one or more protocols of the dedicated user plane.

10. The dedicated wireless subnetwork of claim 8, further comprising:
    a subnetwork slice for controlling the dedicated user device and the dedicated base station, wherein the subnetwork slice is communicatively coupled to a first network slice associated with the first radio unit and the first distributed unit.

11. The dedicated wireless subnetwork of claim 10, wherein the first network slice is configured to operate as a time sensitive network (TSN) bridge in a TSN, and wherein the first network slice is configured to receive one or more requirements associated with the TSN and translate the one or more requirements for the subnetwork slice.

* * * * *

UNITED STATES PATENT AND TRADEMARK OFFICE
CERTIFICATE OF CORRECTION

| | |
|---|---|
| PATENT NO. | : 12,108,262 B2 |
| APPLICATION NO. | : 18/578889 |
| DATED | : October 1, 2024 |
| INVENTOR(S) | : Vincenzo Fiorentino and Sander Rotmensen |

Page 1 of 1

It is certified that error appears in the above-identified patent and that said Letters Patent is hereby corrected as shown below:

In the Claims (Claim 1; Line 35):
"is associated with ene of a first user plane or a first"
Should be replaced with:
"is associated with a first user plane or a first"

(Claim 8; Line 50):
"data packets associated with one of the first control"
Should be replaced with:
"data packets associated with the first control"

Signed and Sealed this
Fifth Day of November, 2024

Katherine Kelly Vidal
*Director of the United States Patent and Trademark Office*